(12) United States Patent
Hays et al.

(10) Patent No.: US 7,305,621 B2
(45) Date of Patent: Dec. 4, 2007

(54) DEFINING A REPORT BASED ON DATA REGIONS AND INCLUDING CUSTOM DATA IN A REPORT DEFINITION

(75) Inventors: Christopher Alan Hays, Monroe, WA (US); Fang Wang, Bellevue, WA (US); Daniel Philip Cory, Seattle, WA (US); Jason Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/400,734

(22) Filed: Mar. 27, 2003

(65) Prior Publication Data

US 2004/0194031 A1    Sep. 30, 2004

(51) Int. Cl.
*G06F 15/00* (2006.01)
*G06F 17/00* (2006.01)
(52) U.S. Cl. .................. 715/530; 715/505; 715/508; 709/227
(58) Field of Classification Search ............... 715/530, 715/505, 508; 709/227
See application file for complete search history.

(56) References Cited

U.S. PATENT DOCUMENTS 5,418,950 A * 5/1995 Li et al. ..................... 707/4
5,504,885 A * 4/1996 Alashqur .................... 717/141
5,603,025 A * 2/1997 Tabb et al. .................... 707/2
5,809,266 A * 9/1998 Touma et al. ............... 715/764
5,832,532 A * 11/1998 Kennedy et al. ............ 715/503

OTHER PUBLICATIONS

"Special Edition, Using Borland Paradox 7 for Window 95 and Windows NT," Johnson, Yvonne, et al., Que Corporation, 1996; Lib. of Cong. Cat. No. 95-71446; ISBN: 1-7897-0205-3; pages: title, 213-30, 303-16, 382-85, 413-17, 522-25, 557-64, and 587-88.*
USPTO Interim Guidelines for Examination of Patent Applications for Patent Subject Matter Eligibility, pp. 1-59, Oct. 26, 2005.*

* cited by examiner

*Primary Examiner*—Doug Hutton
*Assistant Examiner*—N Hillery
(74) *Attorney, Agent, or Firm*—Woodcock Washburn LLP

(57) ABSTRACT

A computer-based report is generated based on report data and according to a report definition describing how to render the report on a page or screen or the like. The report definition may have standard data recognizable to a report processor, and may also have custom data not recognizable to the report processor but to, for example, a rendering extension of such processor. The report processor though not recognizing the custom data. does not delete or ignore but instead passes the custom data in an intermediate format. Thus, the rendering extension which does recognize the passed-through custom data can in fact interpret and act upon such custom data.

8 Claims, 6 Drawing Sheets

DEFINING A REPORT BASED ON DATA REGIONS AND INCLUDING CUSTOM DATA IN A REPORT DEFINITION

CROSS-REFERENCE TO RELATED APPLICATION

The present application is related to U.S. patent application Ser. No. 10/400,375, filed concurrently herewith and entitled "DEFINING A REPORT BASED ON DATA REGIONS AND INCLUDING CUSTOM DATA IN A REPORT DEFINITION".

TECHNICAL FIELD

The present invention relates to a system and method for designing and rendering a report of data based on defined data regions within the report. More particularly, the present invention relates to data regions within such a report that can be defined as extending in more than one dimension, and also to including custom data in a definition of a report.

BACKGROUND OF THE INVENTION

In any industry, enterprise, endeavor, or the like data regarding aspects thereof is accumulated over time for among other things the purpose of reporting status. For example, and with regard to a sales enterprise, sales data can be accumulated with regard to each sale of an item, including the salesman, the customer, the region of the salesman, the region of the customer, the amount of the sale, the quantity of the item sold, the date of the sale, the date of the delivery of the sold item, and/or the like. Based on such sales data, then, it may be that a report is generated that details sales by year, by month, by customer by year, by item by quarter, by salesman by delivery date, by region by week, and/or the like.

Most any report based on report data is generated based on a report definition. As may be appreciated, such report definition describes how to render the report on a page or screen or the like, and in particular describes how to lay out areas on the report such as a header, a footer, a group header, a group footer, a sub-group header, a sub-group footer, a table or other details based on report data, and/or the like. An example of an application for defining a report and rendering the report based on the definition is MICROSOFT ACCESS data organizing and reporting software as developed and marketed by MICROSOFT Corporation of Redmond, Wash., USA.

Significantly, in the prior art, data is organized within a defined report according to bands that extend between the sides of the page, screen, or the like (hereinafter "page"). Thus, a defined report as rendered on a page is a series of bands that extend in one dimension from the top of the page to the bottom thereof. Without anything more, then, elements of organized data within the report such as tables, charts, graphs, and the like are restricted to likewise extending in the one dimension from the top of the page to the bottom of the page. That is, and as an example, a table of data and a graph pictorially representing the table cannot be arranged side-by-side within a band.

In an effort to rectify the inability to define side-by-side elements within a band of a defined report, various artifices have been devised. In one artifice in particular, side-by-side elements are created within a band of a defined report by means of defining sub-reports for each element. However, defining and using such sub-reports is overly complex and cumbersome and still does not achieve more sophisticated goals such as layering elements on top of each other.

Accordingly, a need exists for a report definition and processing system and method that allows a report to be defined such that elements of organized data in the report can extend in more than one dimension, including down a page, across the page, and layered on the page. In particular, a need exists for a report definition and processing system and method that allows a report to be defined according to data regions that are to appear on the page, where the data regions are not bound to extending in any particular dimension. In addition, a need exists for a report definition and processing system and method that is extensible in that custom data can be set forth in a report definition and can be acted upon by an appropriate extension of the system.

SUMMARY OF THE INVENTION

The aforementioned needs are satisfied at least in part by the present invention in which a report definition is to be processed by a report processor to generate a report. The report processor performs predetermined standard functions and includes an extension for performing predetermined extended functions. The report definition includes a plurality of items of standard data that the report processor can process with the predetermined standard functions thereof. The report definition also includes a plurality of items of custom data that the extension can process with the predetermined extended functions thereof. Each item of custom data is referenced by a corresponding item of standard data. The custom data is not recognizable to the report processor but is passed by the report processor to the extension in a format that maintains the reference thereto by the corresponding item of standard data.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Overview

In the present invention, a report is defined according to data regions that may be placed anywhere in three-dimensional space on a page. That is data regions may extend across a page, down a page, or be layered one on top of the other on a page. Thus, report layout is much more flexible than a prior art banded report with bands that extend down the page only. Each data region includes data from a particular data set organized into any of several types of elements including a graph, a table, a header, a footer, and/or the like. Each data region as set forth within a defined report has an X and Y position on the page and a Z (layering) order on the page, and also has a height and width.

Moreover, in the present invention, data from a data set may be represented/displayed in a defined report in multiple data regions thereof. Thus, and for example, data from a data set may be employed to construct a table and also to construct a chart representative of the table. Likewise, data from a data set may be represented in a first data region according to a first vector, such as by time, and in a second data region according to a second vector, such as by a geographic region.

Significantly, the use of data regions in a report definition eliminates the need to use sub-reports in most cases. Accordingly, problems inherent in sub-reports including increased complexity and cumbersomeness are avoided.

Computer Environment

Figure 1:
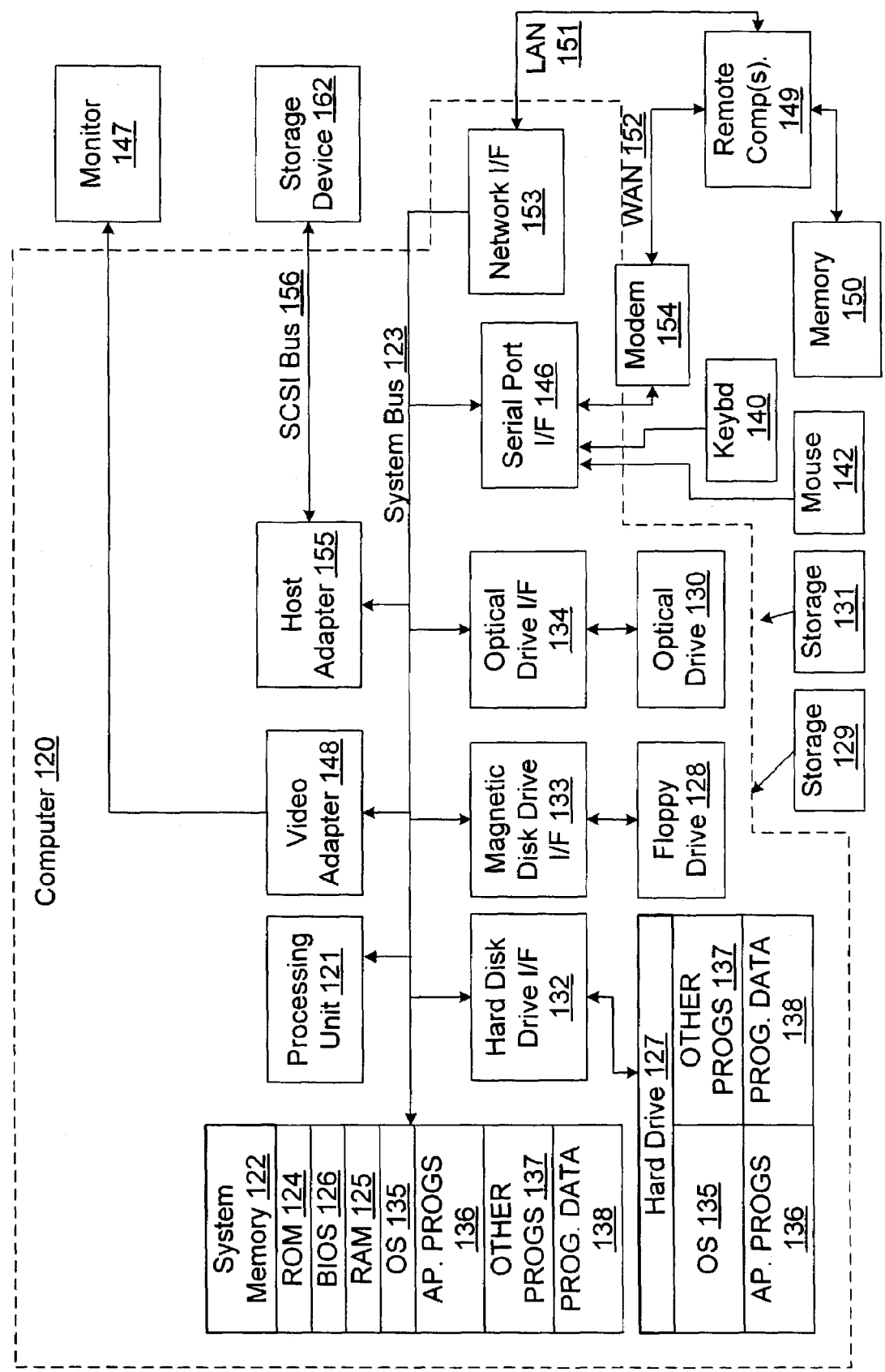
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Report Definition Based on Data Regions

Figure 2:
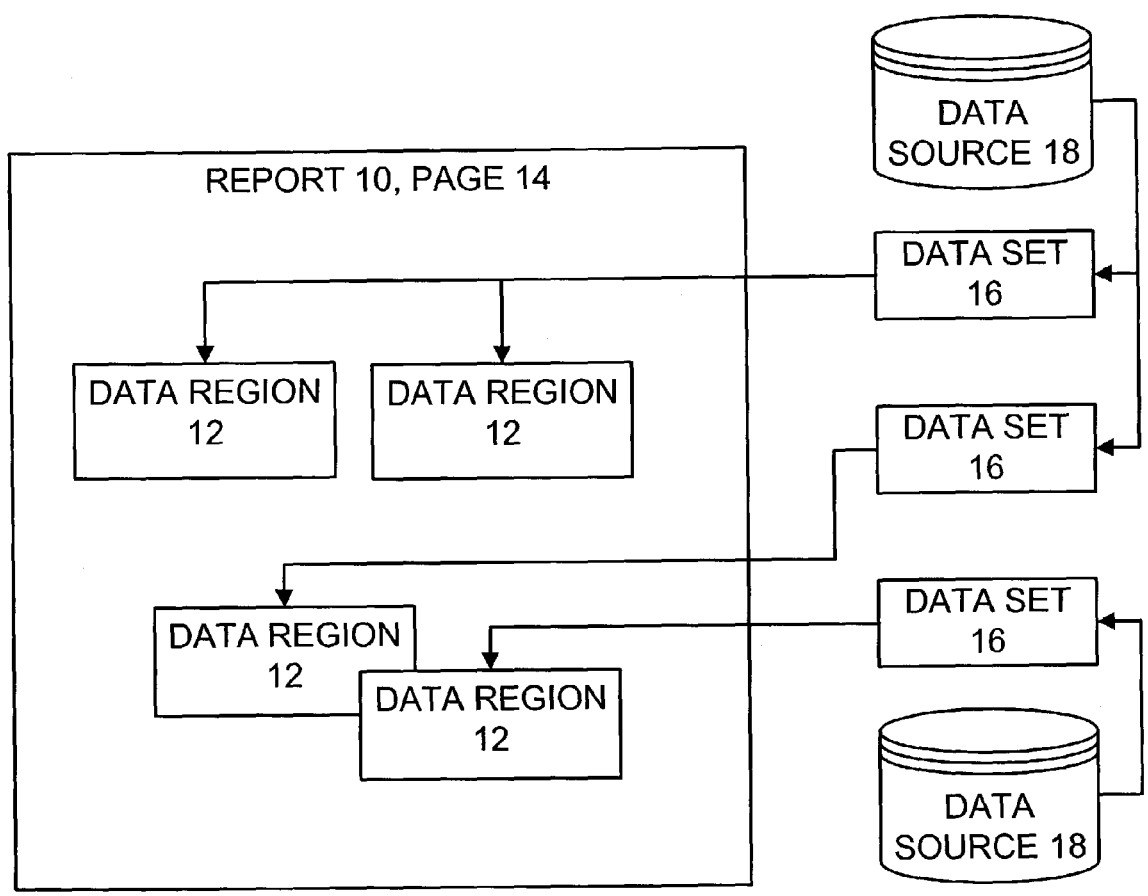
FIG. 2 is a block diagram showing a report laid out according to data regions that extend in multiple dimensions in accordance with one embodiment of the present invention.

In one embodiment of the present invention, and turning now to FIG. 2, it is seen that a report 10 is defined to have a plurality of data regions 12 arranged on a page 14. Significantly, each data region 12 as arranged on the page 14 in the defined report 10 may extend in any particular dimension, including across the page 14, down the page 14, on top of another data region 12, and the like.

Note that each data region 12 as defined in the report 10 of FIG. 2 derives from a particular data set 16, and that each data set 16 derives from a particular data source 18. A data set 16 may be associated many data regions 12 and a data source 18 may be associated with many data sets 16. It may be the case that some data regions 12 in a report 10 actually have no data from any data set 16 and therefore are merely regions. Nevertheless, such regions are still characterized as data regions 12 for purposes of convenience.

Figure 2A:
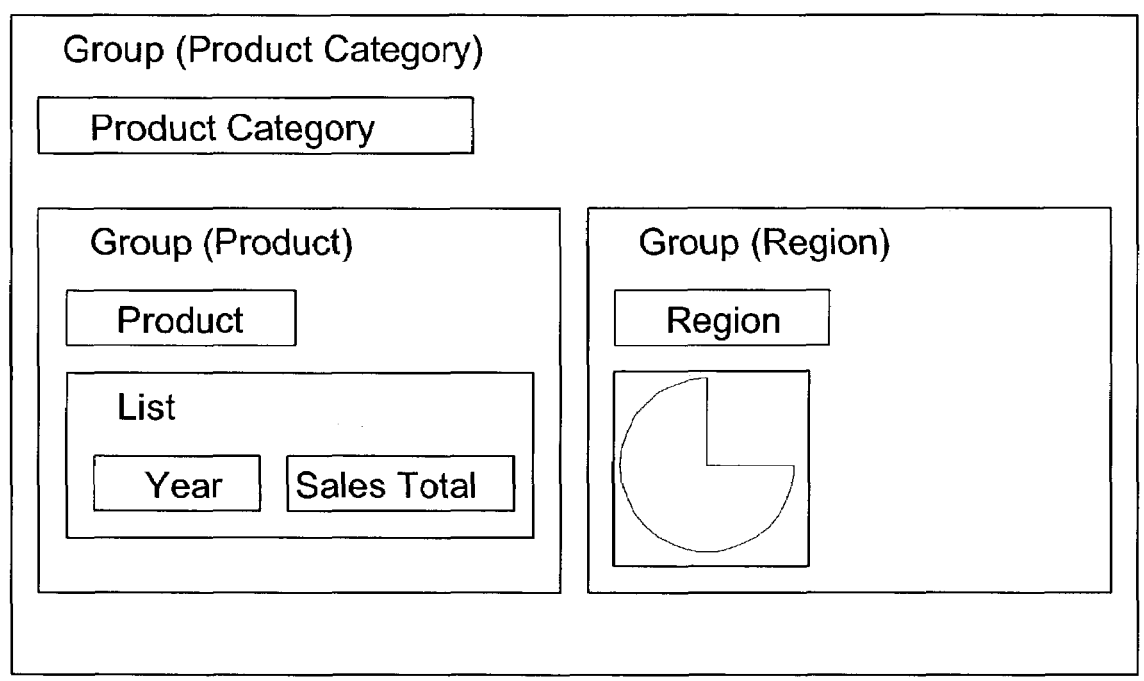
FIG. 2A is a block diagram showing an example of the report of FIG. 2

Turning now to FIG. 2A, a definition of a particular report 10 is shown. As may be appreciated, within the report 10 are one or more data regions 12 such as that of FIG. 2, each representing a Product Category group. Thus, the Product Category group data region is repeatable for however many products categories exist. Each Product Category group data region represents a product category and has associated therewith a Product Category data region with the name of the product category. As seen, the Product Category data region is layered on top of the Product Category group data region. Thus, one data region maybe be located in relation to another data region, and one data region may derive from another data region in a parent-child manner.

As may also be appreciated, within the report 10, for each Product Category group data region there are one or more data regions, each representing a Product group data region. Thus, the Product group data region is repeatable for however many products are in the product category. Each Product group data region represents a product and has associated therewith a Product data region with the name of the product. Each Product group data region also has underneath the Product data region a List data region that lists sales totals for the product by year by way of one or more appropriate data regions. As seen, the Product data region and List data region are layered on top of the Product group data region, and the data regions of the List data region are layered on top of such List data region.

As may further be appreciated, within the report 10, for each Product Category group data region there are one or more data regions, each representing a Region group data region. Thus, the Region group data region is repeatable for however many regions are in the product category. Each Region group data region represents a region and has associated therewith a Region data region with the name of the region. Each Region group data region also has underneath the Region data region a Pie Chart data region that displays a pie chart representative of the region. As seen, the Region data region and Pie Chart data region are layered on top of the Region group data region.

As may still further be appreciated, within the Product Category group data region, each Product group data region is arranged to appear on the left side and each Region group data region is arranged to appear on the right side. Thus, the report 10 as shown in FIG. 2A exhibits data regions extending down, assuming multiple repetitions of the group data definitions, extending across, as represented by the Product group and Region group data regions, and extending in a layered fashion.

Figure 3:
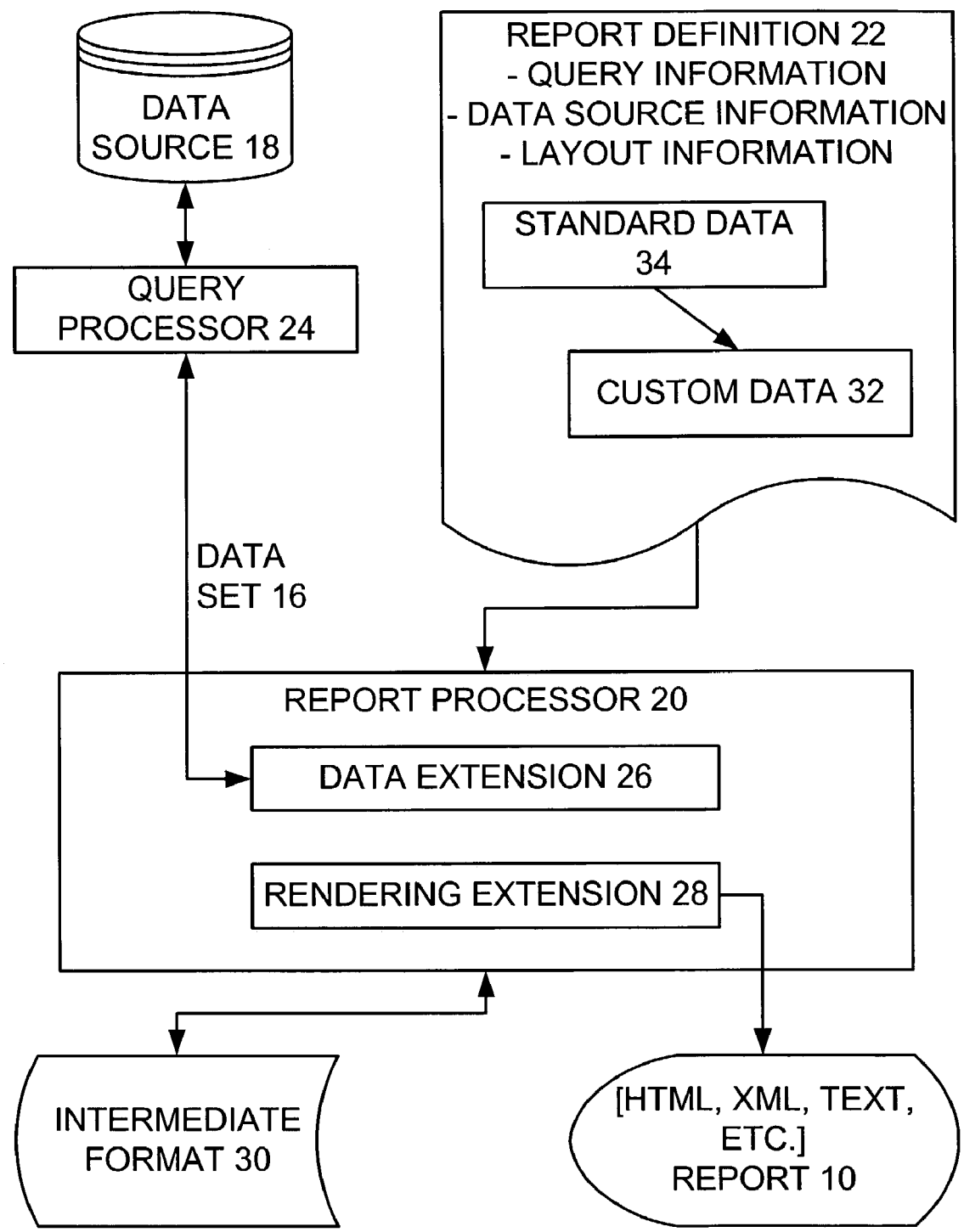
FIG. 3 is a block diagram showing a report processor and related elements for generating the report of FIGS. 2 and 2A in accordance with embodiments of the present invention.

In one embodiment of the present invention, and turning now to FIG. 3, a report 10 is generated by a report processor 20 from a report definition 22. As seen, the report definition 22 includes query information on the queries necessary to develop the data sets 16 that are to populate the data regions 12 with data, and data source information on each data source 18 from which the data sets 16 are to be obtained. The queries set forth in the query information may be based on any particular querying tool without departing from the spirit and scope of the present invention. The data source information includes all information necessary to locate and access each necessary data source 18. Such data source information may include a network location of the data source 18, as well as access parameters such as identifications, passwords, access protocols, and the like.

In one embodiment of the present invention, the report processor 20 does not itself access each necessary data source 18 and perform each query, but instead forwards appropriate portions of the query information and data source information to an appropriate query processor 24. As may be appreciated, based on such information, the query processor 24 accesses the data source 18, performs the query, and forwards the query results to the report processor 20 as the data sets 16.

As also seen in FIG. 3, the report definition 22 includes layout information on the layout of each data region 12 that is to appear in the report. Such layout information includes the size of each data region 14, where each data region 12 is to appear on a page 14, how each data region 12 relates to any other data region 12, and whether and if so how each data region 12 is layered on top of another data region 12. Significantly, the layout information in the report definition 22 also includes for each defined data region 12 an identification of the data set 16 from which the data for such data region is obtained, and information on how to populate the data region 12 with such data set 16.

The report definition 22 may be in an XML format, although other formats may also be employed without departing from the spirit and scope of the present invention. An appropriate report definition generating tool (not shown) may be employed to generate the report definition 22. Such generating tool is known or should be apparent to the relevant public based on the present disclosure, and may include appropriate user interface features to assist a user in constructing a report definition 22.

In one embodiment of the present invention, the report definition 22 with the query information, the data source information, and the layout information is executed by the report processor 20 to in fact generate the report 10. In doing so, the report processor 20 may employ one or more data extensions 26 to access the data by way of one or more query processors 24. Alternatively, the data extensions 26 may in fact be the query processors 24. Extensibility in the report processor 20 is achieved in that an additional data source 18 can be added at any time by providing an appropriate data extension 26.

In addition, the report processor 20 may employ one or more rendering extensions 28 to in fact render the report 10 in a particular format. For example, if a user selects that the report 10 is to be rendered in an HTML format, the report processor 20 would select an HTML rendering extension 28 to so render the report 10. Most any rendering extension 28 may be employed without departing from the spirit and scope of the present invention. For example, the rendering extension 28 may be an XML, bitmap, printer, TIFF, PostScript, PCL, PDF, or JPEG rendering extension, among others. Extensibility in the report processor 20 is also achieved in that an additional type of rendering can be added at any time by providing an appropriate rendering extension 28.

Figure 4:
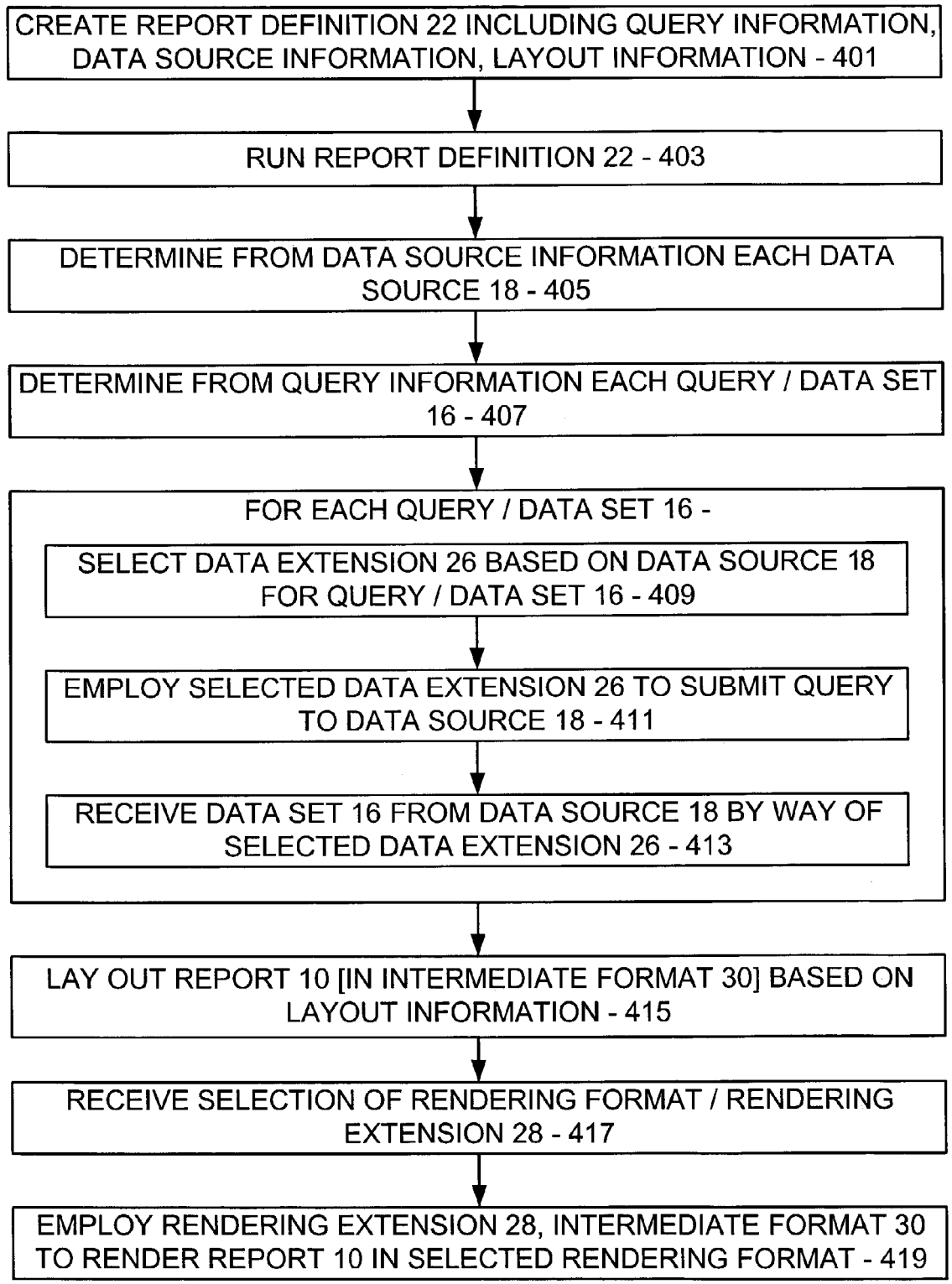
FIG. 4 is a flow chart showing key steps performed by the report processor of FIG. 3 in accordance with one embodiment of the present invention.

Referring now to FIG. 4, a process employed by the report processor 20 to generate a report 10 based on a report definition 22 is shown. Preliminarily, it is to be appreciated that a user creates the report definition 22 in an appropriate manner to define the report 10, and in doing so sets forth the query information, the data source information, and the layout information from which the report is to be generated (step 401). Thereafter, the same user or another user submits the created report definition 22 to the report processor 20 and such report processor 20 runs the report definition 22 (step 403).

In particular, the report processor 20 determines from the data source information in the report definition 22 each data source 18 from which a data set 16 must be obtained to generate the report 10 (step 405). In addition, the report processor 20 determines from the query information in the report definition 22 each query that is to be submitted to obtain a data set 16 and the data source 18 to which the query is submitted to (step 407).

For each data set 16 to be obtained based on a query, then, the report processor 20 selects a data extension 26 based on the data source 18 for the query (step 409) and employs the selected data extension 26 and all information necessary to access the data source 18 to submit the query to the data source 18 (step 411), perhaps by way of an appropriate query processor 24. The data source 18 in due course generates and returns the data set 16, and such data set 16 is received by the report processor 20 by way of the selected data extension 26 (step 413).

Once all data sets 16 needed for the report 10 have been received by the report processor 20, such report processor 20 then lays out the report 10 based on the layout information in the report definition 22 (step 415). In particular, based on each data region 12 defined in the report definition 22, the report processor lays out the data region 12 within the report 10 and populates the data region 12 with data from the data set 16 associated with such data region 12.

In one embodiment of the present invention, the laying out of the report 10 is performed independently of any rendering extension, and in fact the report 10 is laid out into an intermediate format 30. Thus, and as set forth in more detail below, rendering takes place afterward based on a selected rendering extension 28 and the intermediate format 30 of the laid out report 10. Of course, rendering may be performed immediately by a selected rendering extension without the use of an intermediate format 30 without departing from the spirit and scope of the present invention.

Once the report is laid out into the intermediate format 30, then, the report processor 20 in fact renders the report 10 based on a selected rendering extension 28. In particular, at some point, the report processor 20 receives a selection from the user regarding the type of rendering format/rendering extension 28 (step 417). Such selection may of course occur when the report 10 is run (step 403), after the report is laid out into the intermediate format 30 (step 415) or at any other appropriate or necessary time. In addition, the report definition 22 for the report 10 may specify the rendering extension 28 to be selected. With the selected rendering format, then, the report processor 20 employs the corresponding rendering extension 28 and the intermediate format 30 of the report 10 to render the report 10 in the selected format (step 419). The rendered report 10 is then available to be reviewed by the user if in a viewable format, printed by the user if in a printing format, or the like.

Custom Data in the Report Definition 22

As was set forth above, the report processor 20 is extensible in that additional data and rendering functionality may be provided by adding data and rendering extensions 26, 28, respectively. In one embodiment of the present invention, the report processor 20 is also extensible in that the report definition 22 submitted thereto may have custom data 32 that is not recognizable to the report processor 20 but is recognizable to, for example, a rendering extension 28 selected to render the report 10 based on the report definition 22. Accordingly, a report 10 may be imparted with custom rendering effects by defining custom data 32 for such effects in the report definition 22 for such report 10 (FIG. 3), and also by defining a rendering extension 28 that can interpret and act upon such custom data 32.

Custom data 32 can be any type of meta-data that adds to or modifies standard data 34 already recognized by the report processor 20 without departing from the spirit and scope of the present invention. Moreover, custom data 32 is not limited to data to be recognized by a rendering extension 28, but instead may be any data to be recognized by any extension. For example, if the standard data 34 is a text box data region 12, the custom data 32 could be to render the text box with embossed text or inverted colors. Similarly, if the standard data 34 is a digital picture in a picture data region 12, the custom data 32 could be to re-purpose the digital picture within a table data region 12. Likewise, if the standard data 34 related to security, the custom data 32 could be for a security extension (not shown) to calculate a security value in determining whether rendering should take place. As may be appreciated, types of custom data 32 abound, and accordingly any type of custom data may be employed without departing from the spirit and scope of the present invention.

Note, though, that inasmuch as the report processor 20 heretofore did not recognize the custom data 32 in the report definition 22, such report processor 20 deleted or ignored the custom data 32 in laying out the report in the intermediate format 30. In doing so, of course, the custom data 32 was not made available to the rendering extension 28 that is to render the report 10 based on the intermediate format 30 or to any other extensions.

Accordingly, and in one embodiment of the present invention, the custom data 32 within the report definition 22 is tagged as such, and the report processor 20 is programmed to recognize the tagged custom data 32 and pass same through to the intermediate format 30. Thus, in doing so, the passed-through custom data 32 is in fact made available to the rendering extension 28 that is to render the report 10 based on the intermediate format 30, or to any other extension, and the rendering extension 28 or other extension, which does recognize the passed-through custom data 32, can in fact interpret and act upon such custom data 32.

As was set forth above, a report definition 22 defines how to obtain data for data regions 12 of a report 10 and how to lay out the report 10 in an intermediate format 30 that is independent of the type of rendering to be applied to the report 10. In one embodiment of the present invention, the report definition 22 is in a hierarchical format such as XML, and each piece of custom data 32 relates to standard data 34 by being represented within the report definition 22 as a sub-tree depending from a node representing the standard data 34. In addition, the sub-tree is tagged to the effect that such sub-tree represents custom data 32. Thus, the custom data 32 is associated with the standard data 34, and such association can be maintained when the custom data 32 is passed through to the intermediate format 30. In particular, in one embodiment of the present invention, the report processor 20 annotates appropriate parts of the intermediate format 30 with data derived from associated custom data 32. within the report definition 22 as a sub-tree depending from a node representing the standard data 34. In addition, the sub-tree is tagged to the effect that such sub-tree represents custom data 32. Thus, the custom data 32 is associated with the standard data 34, and such association can be maintained when the custom data 32 is passed through to the intermediate format 30. In particular, in one embodiment of the present invention, the report processor 20 annotates appropriate parts of the intermediate format 30 with data derived from associated custom data 32.

Custom data 32 can be static or dynamic. As may be appreciated, static custom data 32 is data that the report processor 20 passes directly through to the intermediate format 30 without any manipulation. For example, such static custom data 32 may be a look-up table used by an extension to look up particular values in connection with the associated piece of standard data 34. In contrast, dynamic custom data 32 is data that the report processor 20 manipulates to produce a result, where the result is passes through to the intermediate format 30 if needed therein. For example, such dynamic custom data 32 may be values employed by the report processor 20 to calculate a contrast level, where the contrast level is passed through to the intermediate format 30. Note that the manipulations performed by the report processor 20 with regard to dynamic custom data 32 may or may not require data from a data set 16. Note also that the result of manipulations with regard to dynamic data 32 may be used by an extension other than the rendering extension 28, in which case the rendering extension 28 need not be aware of the result and such result need not be placed in the intermediate format 30.

Figure 5:
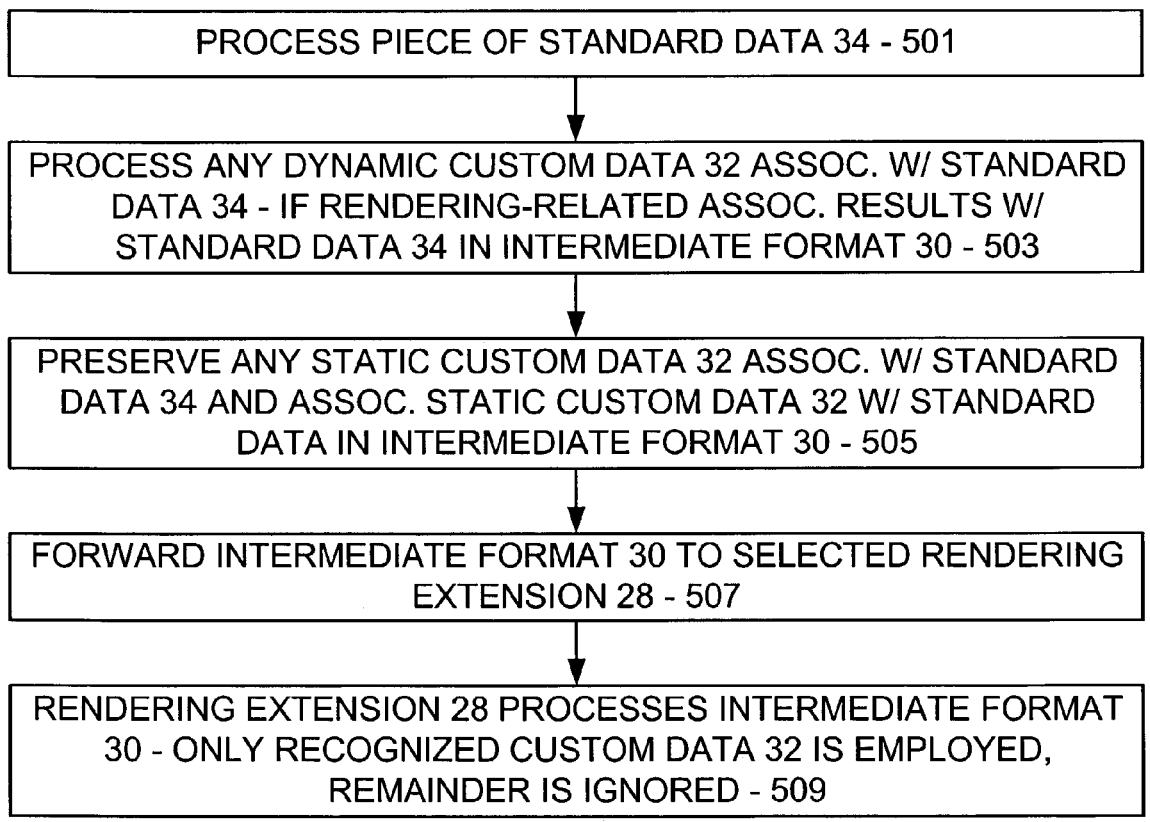
FIG. 5 is a flow chart showing key steps performed by the report processor of FIG. 3 in handling custom data in a report definition.

As may now be appreciated, each piece of custom data 32 within a report definition 22 is specific to one or more particular extensions and is related to a piece of standard data 34 in the report definition 22. Turning now to FIG. 5, when the report processor 20 processes a piece of standard data 34 (step 501), then, such processor 20 also: processes any dynamic custom data 32 associated therewith and if rendering-related associates the results with the standard data in the intermediate format 30 (step 503); and preserves any static custom data 32 associated therewith and associates such static custom data 32 therewith in the intermediate format 30 (step 505). The resulting intermediate format 30 with both data derived from standard data 34 and static custom data 32/data derived from dynamic custom data 32 is then forwarded to the selected rendering extension 28 for rendering and other related additional processing (step 507).

The rendering extension 28 processes the data derived from the standard data 34 to provide core system functionality and the data derived from the custom data 32 to provide extension-specific functionality. If data derived from more than one type of custom data 32 is present in the intermediate format 30, only that which is recognized by the rendering extension 28 is employed; the remainder is ignored (step 509). For example, a custom HTML rendering extension 28 could recognize a custom "frame" annotation on a standard intermediate format object such as a textbox and as a result render the contents of the textbox as HTML in a frame. A different rendering extension 28 that does not recognize the frame annotation would, however, simply render the textbox as a textbox.

Note that data derived from custom data 32 may be applicable to more than one rendering extension 28 without departing from the spirit and scope of the present invention. Thus, multiple extension-specific sets of custom data 32 can be present in the report definition 22, each controlling custom functionality in a respective extension component.

CONCLUSION

The programming necessary to effectuate the processes performed and data structures created in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful report definition and processing system and method that allows a report 10 to be defined such that elements of organized data in the report 10 can extend in more than one dimension, including down a page 14, across the page 14, and layered on the page 14. In addition, the system and method allow a report 10 to be defined according to data regions 12 that are to appear on the page 14, where the data regions 12 are not bound to extending in any particular dimension. Also, the system and method are extensible in that custom data 32 can be set forth in a report definition 22 and can be acted upon by an appropriate extension of the report processor 20.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of processing a report definition on a computer to generate a report, the report definition including a plurality of items of standard data that can be processed by a report process of the computer with predetermined standard functions of such report process, the report definition also including a plurality of items of custom data that cannot be processed by the report process, each item of custom data being referenced by and modifying a corresponding item of standard data within the report definition, the method comprising:

processing each item of standard data of the report definition at the report process of the computer with the predetermined standard functions thereof;

for each item of custom data within the report definition:
  recognizing the item within the report definition as a custom data item based on an identification within the report definition that the item is a custom data item that cannot be processed by the report processor;
  determining an associated extension sub-process of the computer that is operable to process the item of custom data, the associated extension sub-process being determined based on an identification of the associated extension sub-process within the report definition;
  passing the item of custom data as referenced by the corresponding processed item of standard data from the report process to the extension sub-process of the computer as an annotation of and along with the corresponding item of standard data and in a format that maintains the reference thereto by the corresponding item of standard data; and
  processing the passed item of custom data of the report definition at the extension sub-process with the predetermined extended functions thereof and with regard to the corresponding item of standard data.

2. The method of claim 1 wherein each item of custom data is selected from a group consisting of static custom data and dynamic custom data, the method comprising passing the custom data to the extension without any manipulation if static custom data and passing the custom data to the extension as a result based on manipulations applied to such custom data if dynamic custom data.

3. The method of claim 1 wherein the extension sub-process is a rendering sub-process and wherein each item of custom data is rendering data, the method comprising recognizing each item of custom data as rendering data and passing the recognized item of rendering data to the rendering sub-process.

4. The method of claim 1 wherein the report definition is organized in a hierarchical format such that each item of custom data is referenced by a corresponding item of standard data by being represented within the report definition as a sub-tree depending from a node representing the corresponding item of standard data, the method comprising recognizing each item of custom data based on the item of custom data being in a sub-tree of the corresponding item of standard data.

5. A computer-readable medium having stored thereon computer-executable instructions for performing a method of processing a report definition on a computer to generate a report, the report definition including a plurality of items of standard data that can be processed by a report process of the computer with predetermined standard functions, the report definition also including a plurality of items of custom data that cannot be processed by the report process, each item of custom data being referenced by and modifying a corresponding item of standard data within the report definition, the method comprising:
  processing each item of standard data of the report definition at the report process of the computer with the predetermined standard functions thereof;
  for each item of custom data within the report definition:
    recognizing the item within the report definition as a custom data item based on the item of custom data being identified as such an identification within the report definition that the item is a custom data item that cannot be processed by the report processor;
    determining an associated extension sub-process of the computer that is operable to process the item of custom data, the associated extension sub-process being determined based on an identification of the associated extension sub-process within the report definition;
    passing the item of custom data as referenced by the corresponding processed item of standard data from the report process to the extension sub-process of the computer as an annotation of and along with the corresponding item of standard data and in a format that maintains the reference thereto by the corresponding item of standard data; and
    processing the passed item of custom data of the report definition at the extension sub-process with the predetermined extended functions thereof and with regard to the corresponding item of standard data.

6. The medium of claim 5 wherein each item of custom data is selected from a group consisting of static custom data and dynamic custom data, the method comprising passing the custom data to the extension without any manipulation if static custom data and passing the custom data to the extension as a result based on manipulations applied to such custom data if dynamic custom data.

7. The medium of claim 5 wherein the extension sub-process is a rendering sub-process and wherein each item of custom data is rendering data, the method comprising recognizing each item of custom data as rendering data and passing the recognized item of rendering data to the rendering sub-process.

8. The medium of claim 5 wherein the report definition is organized in a hierarchical format such that each item of custom data is referenced by a corresponding item of standard data by being represented within the report definition as a sub-tree depending from a node representing the corresponding item of standard data, the method comprising recognizing each item of custom data based on the item of custom data being in a sub-tree of the corresponding item of standard data.

* * * * *